(12) United States Patent
Corral Rodríguez et al.

(10) Patent No.: US 8,839,995 B2
(45) Date of Patent: Sep. 23, 2014

(54) SECURITY DEVICE FOR A SPARE-WHEEL PICK-UP SYSTEM

(75) Inventors: Pedro Corral Rodríguez, Castro Urdiales (ES); Jose María Puente del Monte, Portugalete (ES); José Ignacio Garrido Ramos, Castro Urdiales (ES)

(73) Assignee: Batz, S.Coop., Igorre (Bizkaia) (ES)

( * ) Notice: Subject to any disclaimer, the term of this patent is extended or adjusted under 35 U.S.C. 154(b) by 362 days.

(21) Appl. No.: 13/231,884

(22) Filed: Sep. 13, 2011

(65) Prior Publication Data

US 2012/0061428 A1    Mar. 15, 2012

(30) Foreign Application Priority Data

Sep. 15, 2010    (ES) .................................. 201031375

(51) Int. Cl.
*B62D 43/00*    (2006.01)

(52) U.S. Cl.
USPC .................... 224/42.23; 224/42.24; 224/42.25

(58) Field of Classification Search
CPC ...................................................... B62D 43/04
USPC ................. 224/42.23, 42.24, 42.25; 254/323; 414/463, 466
See application file for complete search history.

(56) References Cited

U.S. PATENT DOCUMENTS

| | | | | |
|---|---|---|---|---|
| 4,884,785 A | * | 12/1989 | Denman et al. | 254/389 |
| 5,188,341 A | * | 2/1993 | Greaves | 254/323 |
| 6,293,522 B2 | * | 9/2001 | Dobmeier et al. | 254/323 |
| 6,390,452 B1 | * | 5/2002 | Dobmeier et al. | 254/323 |
| 6,427,981 B1 | * | 8/2002 | Kingsbury et al. | 254/323 |
| 6,499,724 B1 | * | 12/2002 | Dobmeier et al. | 254/323 |
| 6,527,252 B2 | * | 3/2003 | Dziedzic | 254/323 |
| 6,547,219 B2 | * | 4/2003 | Dobmeier et al. | 254/323 |
| 6,554,253 B1 | * | 4/2003 | Dobmeier et al. | 254/323 |
| 2002/0066894 A1 | * | 6/2002 | Dobmeier et al. | 254/323 |

FOREIGN PATENT DOCUMENTS

| | | |
|---|---|---|
| EP | 0612653 | 8/1994 |
| EP | 0612653 A1 | 8/1994 |

OTHER PUBLICATIONS

Extended European Search Report for EP application No. 11382288.6, dated Dec. 14, 2011 (search completed Dec. 7, 2011), issued by the European Patent Office, The Hague, Rijswijk, the Netherlands.

* cited by examiner

*Primary Examiner* — Justin Larson
*Assistant Examiner* — Lester L Vanterpool
(74) *Attorney, Agent, or Firm* — Tim L. Kitchen; Peter B. Scull; Hamilton, DeSanctis & Cha LLP

(57) ABSTRACT

Safety devices for vehicle tire carriers including safety features that protect against the tire being dropped upon a failure in a cable system that supports the tire in a stowed condition. In one implementation the tire carrier has a support shaft at least partially housed within a longitudinal sleeve having a window. A pivotable arm has a first feature that engages with a portion of the support shaft to limit downward movement of the support shaft within the longitudinal sleeve when the pivotable arm is in a first rotational position and upon a failure in the cable system to properly support the tire in the stowed condition. The pivotable arm may also have a second feature that engages with the longitudinal sleeve to inhibit the arm from pivoting away from the first rotational position upon a failure in the cable system to properly support the tire in the stowed condition.

29 Claims, 4 Drawing Sheets

SECURITY DEVICE FOR A SPARE-WHEEL PICK-UP SYSTEM

CROSS-REFERENCE TO RELATED APPLICATIONS

This application is related to and claims the benefit and priority to Spanish Patent Application No. P201031375, filed Sep. 15, 2010.

TECHNICAL FIELD

The invention relates to safety devices for systems for picking up spare wheels on motor vehicles.

BACKGROUND

In some vehicles a spare wheel is held beneath the chassis of the vehicle by means of a spare-wheel pick-up system. The system includes a support shaft on which is supported the wheel, a cable fixed to the support shaft and a mechanism to cause the cable to move up or down to raise or lower the spare wheel. Generally speaking, additionally, when the wheel is held beneath the chassis of the vehicle, the cable is wound onto a drum.

It is known that on occasions, due mainly to the vibrations the vehicle has to withstand, the cable unwinds from or comes off the drum, with the risk that the support shaft, and therefore the wheel, falls. It may also be the case that the cable snaps, due to vibrations or to the fact that the wheel is improperly tightened on the chassis

SUMMARY OF THE DISCLOSURE

According to one implementation a spare-wheel pick-up system or tire carrier for use in motor vehicles is provided that comprises a longitudinal sleeve with a window, a shaft fixed to the cable and disposed in the longitudinal sleeve, which is also longitudinally movable in the interior of the longitudinal sleeve, and an arm with a coupling section, disposed outside the longitudinal sleeve and pivotable in relation to an axis of rotation between a first position in which the coupling section passes through the window of the longitudinal sleeve and a second position in which the coupling section is retracted in relation to the window. The support shaft supports the spare wheel and comprises a limiter to cooperate with the coupling section when the arm is in the first position, the arm holding the shaft, and therefore the spare wheel, limiting the movement of the shaft in the longitudinal sleeve to prevent the spare wheel from falling when the cable snaps (or when the cable comes off the drum, for example).

In one implementation the device also comprises a locker adapted to prevent, when in the first position, the arm from moving from the first position to the second position when the cable snaps.

In the event the cable snaps the shaft and the arm cooperate to prevent the spare wheel from falling. If the cable snaps while the vehicle is moving, there is a risk that a pothole, for example, may cause the arm and the shaft to stop cooperating with each other (the arm leaves its first position), causing the spare wheel to fall. The safety device eliminates this risk, as the locker prevents the arm from leaving its first position even in the event of potholes and major abnormalities in the road on which the vehicle is travelling, the arm and the shaft maintaining cooperation with each other, thus ensuring that the arm holds the shaft at all times, and therefore the spare wheel.

According to one implementation a safety device for a tire carrier of a vehicle is provided comprising: a substantially hollow longitudinal sleeve attached to the vehicle with at least one window extending between inner and outer surfaces of the sleeve, a support shaft having a first end and a second end, the support shaft at least partially housed and moveable in the longitudinal sleeve, the first end of the support shaft comprising a limiter and being coupled to a cable that is adapted to move the support shaft upward or downward within the longitudinal sleeve, the second end of the support shaft attached to a structure that carries the tire, an arm with a coupling section that pivots about an axis of rotation between a first rotational position in which the coupling section extends through the window of the longitudinal sleeve and a second rotational position in which the coupling section resides at least partially outside the window, the coupling section and the limiter of the support shaft comprising co-operable parts that engage one another to limit downward movement of the support shaft when the arm is in the first rotational position, in a first position the cable provides sufficient tension to cause the support shaft to maintain a separation distance between the co-operable parts of the coupling section and the limiter, the arm comprising a feature engageable with the longitudinal sleeve, the feature adapted to engage with the longitudinal sleeve to inhibit the arm from being moved from the first rotational position to the second rotational position upon there being insufficient cable tension to maintain a separation distance between the co-operable parts of the coupling section and the limiter when the arm is in the first rotational position.

These and other advantages and characteristics of the invention will be made evident in the light of the drawings and the detailed description thereof.

DETAILED DESCRIPTION

Figure 1:
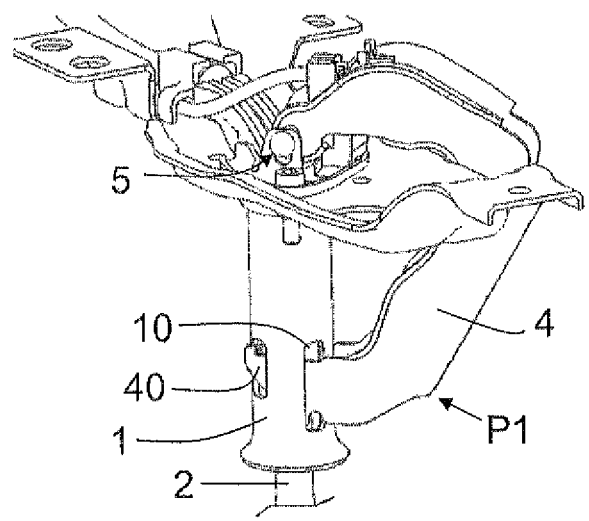
FIG. 1 shows a perspective view of the device according to one implementation, with an arm in a first position.
Figure 2:
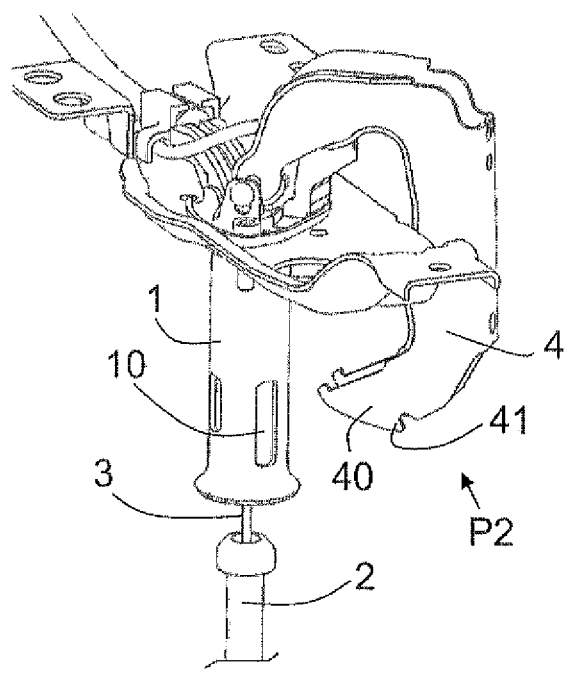
FIG. 2 shows a perspective view of the device of FIG. 1, with the arm in a second position.

The Figures show an embodiment of a safety device designed for use in a spare-wheel pick-up system/tire carrier in vehicles. In one implementation the device comprises a substantially hollow longitudinal sleeve 1 with at least one window 10, fixed to the structure of the vehicle, a support shaft 2 fixed to a cable 3, which is partially housed in the interior of the sleeve 1 and which is longitudinally displaceable in the interior of the sleeve 1, and an arm 4 with a coupling section 40 on one end, disposed outside the sleeve 1 and pivotable in relation to an axis of rotation 5 between a first position P1, shown for example in FIG. 1, in which the coupling section 40 passes through the window 10 of the sleeve 1, the coupling section 40 being in the interior of the sleeve 1 in the first position P1, and a second position P2, shown in FIG. 2, in which the coupling section 40 is retracted in relation to the window 10, the coupling section 40 being outside the sleeve 1 in the second position P2.

Figure 3:
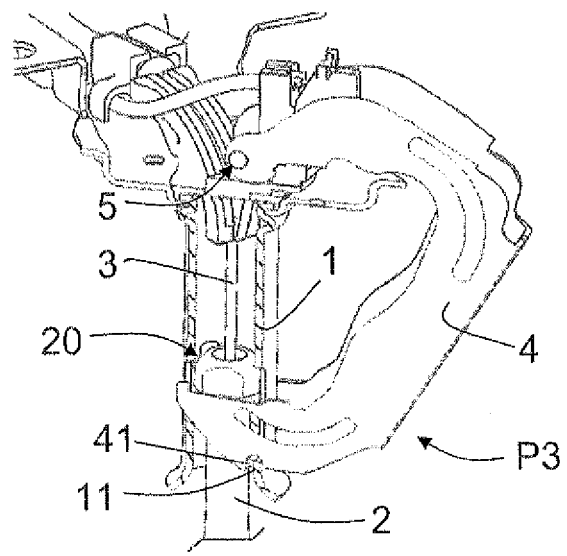
FIG. 3 shows a cross-sectional view of the device of FIG. 1, with the arm in a third position.

The support shaft 2 supports the spare wheel (not shown in the Figures) when it is housed in the sleeve 1, and comprises a limiter 20 to cooperate with the coupling section 40 in the first position P1, thereby limiting the displacement of the support shaft 2 in the sleeve 1. With reference to FIG. 3, the limiter 20 can correspond with an end of the support shaft 2 that in one implementation comprises a substantially mushroom shape. In one implementation the coupling section 40 corresponds with a hook that connects to the end of the support shaft 2 when the cable 3 fails, the arm 4 thus holding the support shaft 2 during cable failure. Cable failure may occur as a result of the cable snapping/breaking, the cable coming off a winch drum, or in some other way fails to support the tire in the stowed position.

The device also comprises a locking mechanism adapted to prevent, when in the first position P1, the arm 4 from being displaced from the first position P1 to the second position P2 when the cable 3 fails which would release the support shaft 2 and would result in the spare wheel falling to the ground, which could result in a very dangerous situation. If the cable 3 fails while the vehicle is moving, there is a risk that a pothole, for example, may cause the arm 4 and the support shaft 2 to stop cooperating with each other, causing the spare wheel to fall. The safety device eliminates this risk as the locking mechanism prevents the arm 4 from leaving its first position P1, to ensure the arm 4 and the support shaft 2 cooperate with each other, thereby ensuring that the arm 4 holds the support shaft 2 at all times and, therefore, continues to hold the spare wheel in a safe manner.

In one implementation the locking mechanism comprises a projection 41 on the coupling section 40 of the arm 4 as shown in FIG. 3. In one implementation the projection cooperates with an inner wall 11 of the sleeve 1 to prevent the arm 4 from being displaced from the first position P1 to the second position P2. When, as a result of a vibration or the vehicle going over a pothole, for example, that may cause the displacement of the arm 4 in the direction of the second position P2, the inner wall 11 acts as a stop upon the projection 41 abutting against it, the arm 4 being unable to be displaced to the second position P2, the arm 4 remaining held to the support shaft 2 and, therefore, to the spare wheel. In one implementation the portion of the inner wall 11 that acts as the stop is beneath the window 10. In another implementation the portion of the inner wall 11 that acts as the stop is at a side of the window 10.

Figure 4:
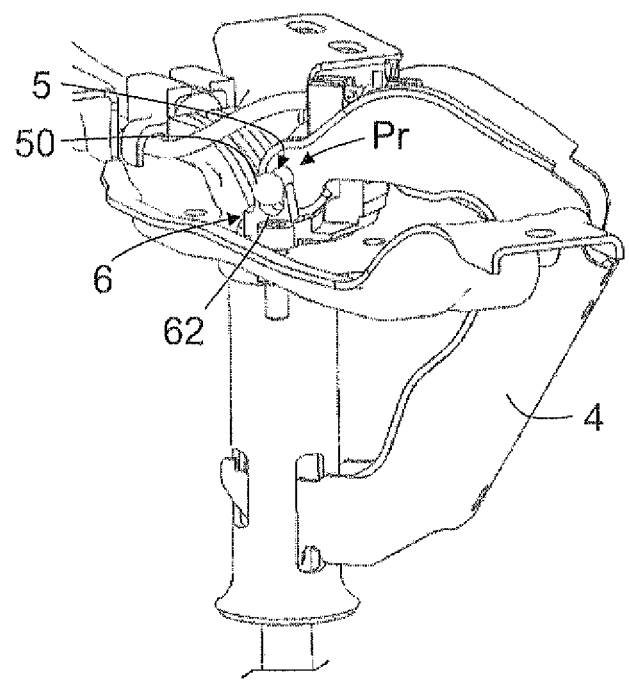
FIG. 4 shows the support piece of the device according to one implementation, with an axis of rotation of the device in a rest position.
Figure 5:
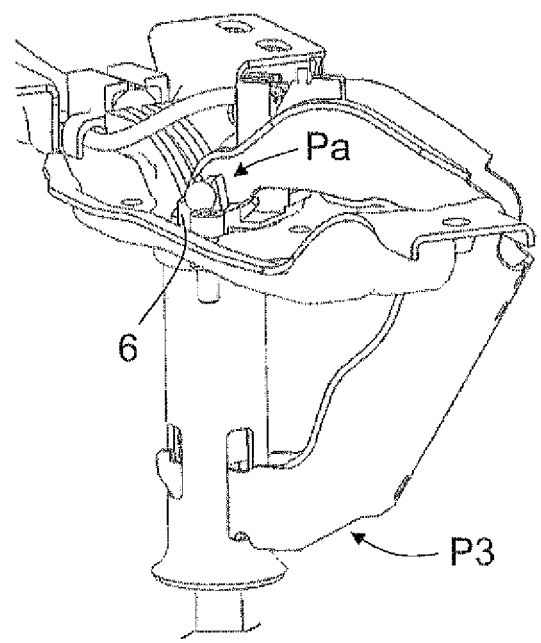
FIG. 5 shows a support piece of the device according to one implementation, with the axis of rotation of the device in an active position.
Figure 6:
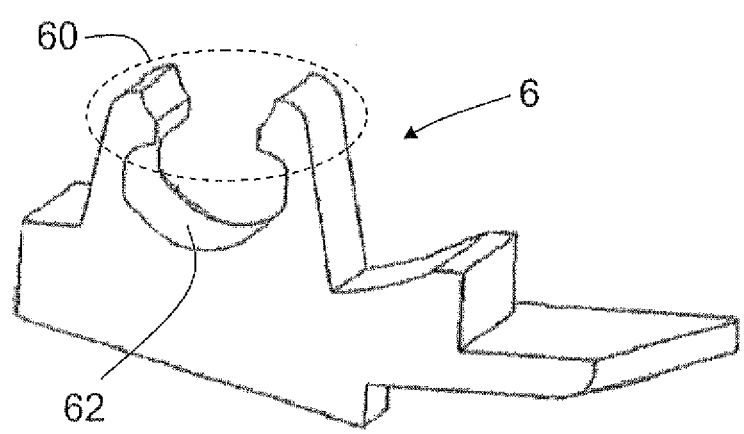
FIG. 6 shows in detail a support piece according to one implementation.

In one implementation the tire carrier comprises a support piece 6, fixed to the structure of the vehicle, on which is supported the axis of rotation 5. FIG. 4 shows the support piece 6 in a rest position Pr. The axis of rotation 5 is moved in relation to the support piece 6 to an active position Pa when the cable 3 fails, the arm 4 being in the first position P1 due to the weight of the spare wheel, the arm 4 being moved in conjunction with the axis of rotation 5 to a third position P3 shown in FIGS. 3 and 5, for example, the projection 41 being left facing the inner wall 11 of the housing 1 as a result of the displacement in the active position Pa. When the cable 3 fails, the support shaft 2 descends or falls due to the weight of the spare wheel until it cooperates with the coupling section 40 of the arm 4, holding the arm 4 to the support shaft 2 and, therefore, to the spare wheel when it is in the first position P1. The weight of the wheel also causes the displacement of the axis of rotation 5 and the arm 4 in relation to the support piece 6, for example in a substantially vertical direction. The support piece 6 can comprise a break section 60 shown in FIG. 6 (in which the support piece 6 is broken) or a break groove on which is supported the axis of rotation 5, which breaks when it has to support the weight of the spare wheel, the axis of rotation 5 falling, although it can also comprise an elastic support section on which is supported the axis of rotation 5, which acts as a pincer or clip, and which opens due to the weight of the spare wheel when with the arm 4 in the first position P1 the cable 3 fails, thereby enabling the displacement of the axis of rotation 5. In another configuration not shown in the Figures, the support piece is resiliently supported, such as, for example, by at least one spring that keeps the support piece 6 in a position in which the axis of rotation 5 remains supported on the support piece 6, the weight of the wheel causing the compression of the spring and, therefore, the displacement of the support piece 6 when the cable 3 fails, thereby enabling the displacement of the axis of rotation 5. The device may comprise two support pieces 6 facing each other, two different sections of the axis of rotation 5 being supported on both support pieces 6.

Figure 7:
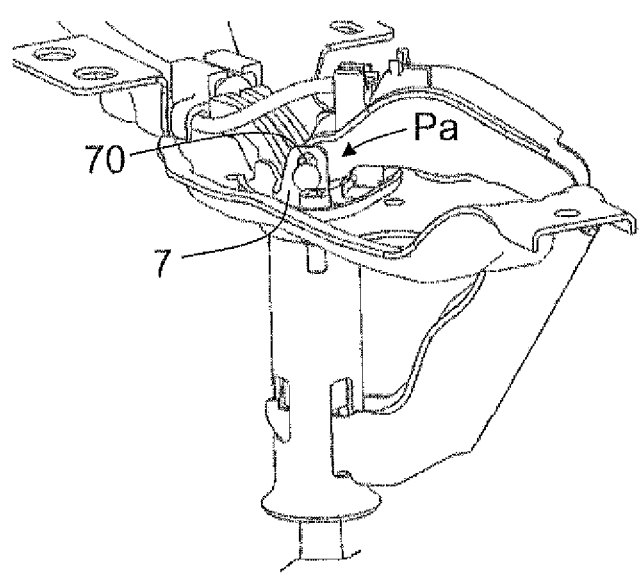
FIG. 7 shows a guide piece according to one implementation, with the axis of rotation of the device in an active position.

The device may also comprise at least one guide piece 7 with a groove 70 to guide the displacement of the axis of rotation 5 when the cable 3 fails, which may be substantially vertical, the axis of rotation 5 being housed transversally in the groove 70. The device can comprise two guide pieces 7, each end of the axis of rotation 5 being housed in the groove 70 of a corresponding guide piece 7. In one implementation the axis of rotation 5 comprises a cap or a projecting member 50 on each end, so that the axis of rotation 5 is prevented from being dislodged from the groove 70. As a result of the guide piece 7 and its groove 70, the displacement of the axis of rotation 5 due to the weight of the wheel is guided, it being displaced from the rest position Pr shown in FIG. 7 to the active position Pa shown in FIG. 2 in a guided manner, the displacement thus being controlled, thereby preventing or largely stopping the displacement from undesired or uncontrolled effects. The guide piece 7 is fixed to the structure of the vehicle and disposed adjacent to the support piece 6.

In one implementation the support piece 6 may be made of plastic and the guide piece 7 may be made of steel. As a result, the displacement of the axis of rotation 5 and, therefore, the arm 4, is limited by the guide piece 7 and in particular by a limiting surface 71 of the groove 70 of the guide piece 7 on which is supported the axis of rotation 5 when it moves due to the weight of the wheel, as the guide piece 7 is sufficiently strong to support the weight due to the material used. In another implementation the support piece 6 can be made of steel, for example, so that the support piece 6 would limit the displacement, by means of a base 62 of the support piece 6 on which the axis of rotation 5 is supported. In this last case, the support piece 6 can also be used as a guide, allowing the guide piece 7 to be dispensed with.

What is claimed is:

1. A safety device for a tire carrier of a vehicle comprising:
a substantially hollow longitudinal sleeve attached to the vehicle with at least one window extending between inner and outer surfaces of the sleeve,
a support shaft having a first end and a second end, the support shaft at least partially housed and moveable in the longitudinal sleeve, the first end of the support shaft comprising a limiter and being coupled to a cable that is adapted to move the support shaft upward or downward within the longitudinal sleeve, the second end of the support shaft attached to a structure that carries the tire,
an arm with a coupling section that pivots about an axis of rotation between a first rotational position in which the coupling section extends through the window of the longitudinal sleeve and a second rotational position in which the coupling section resides at least partially outside the window, the coupling section and the limiter of the support shaft comprising co-operable parts that engage one another to limit downward movement of the support shaft when the arm is in the first rotational position, in a first position the cable provides sufficient tension to cause the support shaft to maintain a separation distance between the co-operable parts of the coupling section and the limiter, the arm comprising a feature engageable with the longitudinal sleeve, the feature adapted to engage with the longitudinal sleeve to inhibit the arm from being moved from the first rotational position to the second rotational position upon there being insufficient cable tension to maintain a separation distance between the co-operable parts of the coupling section and the limiter when the arm is in the first rotational position, the axis of rotation of the arm being supported by a support piece, the axis of rotation moveable between a first position and a second position on the support piece, the axis of rotation being displaceable in a downward direction from the first position to the second position upon there being insufficient cable tension to maintain a separation distance between the co-operable parts of the coupling section and the limiter when the arm is in the first rotational position.

2. A safety device according to claim 1, wherein the feature comprises a projection which cooperates with the inner surface of the longitudinal sleeve.

3. A safety device according to claim 2, wherein the inner surface with which the projection cooperates is beneath the window.

4. A safety device according to claim 2, wherein the inner surface with which the projection cooperates is on one side of the window.

5. A safety device according to claim 1, wherein the support piece comprises a break section on which is supported the axis of rotation, the break section being breakable to cause a downward displacement of the axis of rotation upon the cable providing insufficient tension to maintain a separation distance between the co-operable parts of the coupling section and the limiter.

6. A safety device according to claim 1, wherein the support piece comprises an elastic support section on which is supported the axis of rotation, the elastic support section deformable to cause a downward displacement of the axis of rotation upon there being insufficient cable tension to maintain a separation distance between the co-operable parts of the coupling section and the limiter.

7. A safety device according to claim 6, wherein the elastic support structure comprises a substantially pincer shaper.

8. A safety device according to claim 6, wherein the elastic support structure comprises a substantially clip shape.

9. A safety device according to claim 1, further comprising one or more guides that guide the downward movement of the axis of rotation.

10. A safety device according to claim 9, wherein the one or more guides comprise a groove where the axis of rotation is transversally housed.

11. A safety device according to claim 10, wherein the groove is substantially vertical.

12. A safety device according to claim 10, wherein the groove comprises a limiting surface that limits the downward movement of the axis of rotation.

13. A safety device according to claim 9, wherein the support piece is made of a plastic material and the one or more guides are made of a metallic material.

14. A safety device for a tire carrier of a vehicle comprising:
    a substantially hollow longitudinal sleeve attached to the vehicle with at least one window extending between inner and outer surfaces of the sleeve,
    a support shaft having a first end and a second end, the support shaft at least partially housed and moveable in the longitudinal sleeve, the first end of the support shaft comprising a limiter and being coupled to a cable that is adapted to move the support shaft upward or downward within the longitudinal sleeve, the second end of the support shaft attached to a structure that carries the tire,
    an arm with a coupling section that pivots about an axis of rotation between a first rotational position in which the coupling section extends through the window of the longitudinal sleeve and a second rotational position in which the coupling section resides at least partially outside the window, the coupling section and the limiter of the support shaft comprising co-operable parts that engage one another to limit downward movement of the support shaft when the arm is in the first rotational position, in a first position the cable provides sufficient tension to cause the support shaft to maintain a separation distance between the co-operable parts of the coupling section and the limiter, the arm comprising a feature engageable with the longitudinal sleeve, the feature adapted to engage with the longitudinal sleeve to inhibit the arm from being moved from the first rotational position to the second rotational position upon there being insufficient cable tension to maintain a separation distance between the co-operable parts of the coupling section and the limiter when the arm is in the first rotational position,
    the axis of rotation of the arm being supported by a resiliently supported structure, the resiliently supported structure being displaceable in a downward direction upon there being insufficient cable tension to maintain a separation distance between the co-operable parts of the coupling section and the limiter when the arm is in the first rotational position.

15. A safety device according to claim 14, further comprising one or more guides that guide the downward movement of the axis of rotation.

16. A safety device according to claim 15, wherein the one or more guides comprise a groove where the axis of rotation is transversally housed.

17. A safety device according to claim 16, wherein the groove is substantially vertical.

18. A safety device according to claim 16, wherein the groove comprises a limiting surface that limits the downward movement of the axis of rotation.

19. A safety device according to claim 15, wherein the resiliently supported structure is made of a plastic material and the one or more guides are made of a metallic material.

20. A safety device for a tire carrier of a vehicle comprising:
    a substantially hollow longitudinal sleeve attached to the vehicle with at least one window extending between inner and outer surfaces of the sleeve,
    a support shaft having a first end and a second end, the support shaft at least partially housed and moveable in the longitudinal sleeve, the first end of the support shaft comprising a limiter and being coupled to a cable that is adapted to move the support shaft upward or downward within the longitudinal sleeve, the second end of the support shaft attached to a structure that carries the tire, an arm with a coupling section that pivots about an axis of rotation between a first rotational position in which the coupling section extends through the window of the longitudinal sleeve and a second rotational position in which the coupling section resides at least partially outside the window, the coupling section and the limiter of the support shaft comprising co-operable parts that engage one another to limit downward movement of the support shaft when the arm is in the first rotational position, in a first position the cable provides sufficient tension to cause the support shaft to maintain a separation distance between the co-operable parts of the coupling section and the limiter, the arm comprising a feature engageable with the longitudinal sleeve, the feature adapted to engage with the longitudinal sleeve to inhibit the arm from being moved from the first rotational position to the second rotational position upon there being insufficient cable tension to maintain a separation distance between the co-operable parts of the coupling section and the limiter when the arm is in the first rotational position, the axis of rotation of the arm being supported by a first support piece and a second support piece, the axis of rotation being displaceable in a downward direction with respect to one or both of the first and second support pieces upon there being insufficient cable tension to maintain a separation distance between the co-operable parts of the coupling section and the limiter when the arm is in the first rotational position.

21. A safety device according to claim 20, wherein the one or both of the first and second support pieces comprises a break section on which is supported the axis of rotation, the break section being breakable to cause a downward displacement of the axis of rotation upon the cable providing insufficient tension to maintain a separation distance between the co-operable parts of the coupling section and the limiter.

22. A safety device according to claim 20, wherein one or both of the first and second support pieces comprises an elastic support section on which is supported the axis of rotation, the elastic support section deformable to cause a downward displacement of the axis of rotation upon there being insufficient cable tension to maintain a separation distance between the co-operable parts of the coupling section and the limiter.

23. A safety device according to claim 22, wherein the elastic support structure comprises a substantially pincer shaper.

24. A safety device according to claim 22, wherein the elastic support structure comprises a substantially clip shape.

25. A safety device according to claim 20, further comprising one or more guides that guide the downward movement of the axis of rotation.

26. A safety device according to claim 25, wherein the one or more guides comprise a groove where the axis of rotation is transversally housed.

27. A safety device according to claim 26, wherein the groove is substantially vertical.

28. A safety device according to claim 26, wherein the groove comprises a limiting surface that limits the downward movement of the axis of rotation.

29. A safety device according to claim 25, wherein the first and second support pieces are made of a plastic material and the one or more guides are made of a metallic material.

\* \* \* \* \*